(12) United States Patent
Lapp et al.

(10) Patent No.: US 12,176,944 B2
(45) Date of Patent: Dec. 24, 2024

(54) PROTECTION SWITCHING BASED ON SNR CALCULATIONS

(71) Applicant: Ciena Corporation, Hanover, MD (US)

(72) Inventors: Michael Lapp, Richmond (CA); Mark R. Hinds, Ottawa (CA)

(73) Assignee: Ciena Corporation, Hanover, MD (US)

( * ) Notice: Subject to any disclaimer, the term of this patent is extended or adjusted under 35 U.S.C. 154(b) by 184 days.

(21) Appl. No.: 18/103,705

(22) Filed: Jan. 31, 2023

(65) Prior Publication Data

US 2024/0259093 A1   Aug. 1, 2024

(51) Int. Cl.
| | |
|---|---|
| *H04B 10/03* | (2013.01) |
| *H04B 10/079* | (2013.01) |
| *H04B 10/032* | (2013.01) |
| *H04B 10/07* | (2013.01) |
| *H04J 14/02* | (2006.01) |
| *H04Q 11/00* | (2006.01) |

(52) U.S. Cl.
CPC ....... *H04B 10/03* (2013.01); *H04B 10/07953* (2013.01); *H04B 10/032* (2013.01); *H04B 10/07* (2013.01); *H04B 10/079* (2013.01); *H04B 10/0795* (2013.01); *H04J 14/0287* (2013.01); *H04J 14/0289* (2013.01); *H04J 14/0293* (2013.01); *H04Q 2011/0081* (2013.01); *H04Q 2011/0083* (2013.01)

(58) Field of Classification Search
CPC .............. H04B 10/03; H04B 10/07953; H04B 10/032; H04B 10/07; H04B 10/079; H04B 10/0795; H04J 14/0287; H04J 14/0289; H04J 14/0293; H04Q 2011/0081; H04Q 2011/0083
USPC ....................................................... 398/1–38
See application file for complete search history.

(56) References Cited

U.S. PATENT DOCUMENTS

| | | | |
|---|---|---|---|
| 6,236,499 B1 | 5/2001 | Berg et al. | |
| 6,786,647 B1 | 9/2004 | Hinds et al. | |
| 6,810,011 B1 | 10/2004 | Betts | |
| 6,920,287 B1 | 7/2005 | Hinds et al. | |
| 6,952,529 B1 * | 10/2005 | Mittal | H04B 10/07953 398/33 |
| 7,095,956 B2 * | 8/2006 | Levandovsky | H04Q 11/0062 398/45 |
| 8,364,036 B2 | 1/2013 | Boertjes et al. | |
| 8,750,706 B2 | 6/2014 | Boertjes et al. | |

(Continued)

*Primary Examiner* — Dibson J Sanchez
(74) *Attorney, Agent, or Firm* — Baratta Law PLLC; Lawrence A. Baratta, Jr.

(57) ABSTRACT

Systems and methods for monitoring an Optical Multiplex Section of a communication network are provided. A method, according to one implementation, includes the step of obtaining parameters related to optical signals traversing an Optical Multiplex Section (OMS) of a communication network. The OMS, in this example, includes multiple fiber spans defining a primary path and one or more protection paths. The method further includes the step of using the obtained parameters to determine a Signal-to-Noise Ratio (SNR) value associated with optical signals transmitted over the primary path. In response to determining that the SNR value falls below a predetermined threshold, the method includes the step of performing a switching action to enable transmission of optical signals over one of the one or more protection paths.

20 Claims, 4 Drawing Sheets

(56) References Cited

U.S. PATENT DOCUMENTS

| | | | |
|---|---|---|---|
| 8,934,768 B2* | 1/2015 | Bottari | H04J 14/02 398/57 |
| 10,193,765 B2 | 1/2019 | Holness et al. | |
| 10,826,601 B2 | 11/2020 | Bhatnagar et al. | |
| 11,258,509 B2 | 2/2022 | Chedore et al. | |
| 11,444,719 B2 | 9/2022 | Al Sayeed et al. | |
| 11,553,262 B1 | 1/2023 | Al Sayeed et al. | |
| 2002/0083374 A1 | 6/2002 | Hinds et al. | |
| 2002/0135839 A1* | 9/2002 | Aono | H04J 14/0204 385/24 |
| 2002/0159132 A1* | 10/2002 | Grochocinski | H04B 10/2916 359/334 |
| 2003/0016654 A1* | 1/2003 | Das | H04J 14/029 370/351 |
| 2003/0151802 A1 | 8/2003 | Berg et al. | |
| 2007/0206512 A1 | 9/2007 | Hinds et al. | |
| 2007/0208840 A1 | 9/2007 | McConville et al. | |
| 2008/0050114 A1* | 2/2008 | Pecci | H04B 10/07955 398/2 |
| 2009/0116833 A1* | 5/2009 | Shimizu | H04J 14/0246 398/2 |
| 2010/0040364 A1* | 2/2010 | Jenkins | H04B 10/275 398/26 |
| 2010/0232784 A1* | 9/2010 | Rarick | H04B 14/029 398/5 |
| 2010/0290780 A1* | 11/2010 | Teipen | H04J 14/0293 398/34 |
| 2010/0322622 A1* | 12/2010 | Shukunami | H04B 10/07953 398/26 |
| 2011/0222846 A1* | 9/2011 | Boertjes | H04J 14/0268 398/1 |
| 2012/0076490 A1* | 3/2012 | Han | H04J 14/0284 398/7 |
| 2014/0079389 A1* | 3/2014 | Han | H04J 14/02216 398/79 |
| 2014/0133849 A1* | 5/2014 | Ishii | H04B 10/0793 398/26 |
| 2015/0333825 A1* | 11/2015 | Kim | H04B 10/2531 398/26 |
| 2017/0134089 A1* | 5/2017 | Mansouri Rad | H04J 14/0271 |
| 2018/0337727 A1* | 11/2018 | Yoshida | H04B 10/07953 |
| 2020/0092026 A1* | 3/2020 | Birk | H04J 14/0257 |
| 2020/0412446 A1* | 12/2020 | Liu | H04B 10/079 |
| 2022/0131627 A1* | 4/2022 | Beacall | H04B 17/3913 |

* cited by examiner

PROTECTION SWITCHING BASED ON SNR CALCULATIONS

TECHNICAL FIELD

The present disclosure generally relates to networking systems and methods. More particularly, the present disclosure relates to switching network traffic in an Optical Multiplex Section (OMS) from a primary path to a protection path in response to Signal-to-Noise Ratio (SNR) degradation in the OMS.

BACKGROUND

Generally, a communication system includes many nodes, switches, routers, Reconfigurable Optical Add/Drop Multiplexing (ROADM) devices, etc. for transmitting data traffic over multiple fiber spans. Some Optical Multiplex Sections (OMSs) may include trunks or bundles of fiber optical cables. In an OMS, there may be multiple paths from one end to the other. Some paths may be designated as protection paths to be used when a main path is unavailable or faulty. For example, one key reason that the main path may be unavailable is when the optical power measured along the OMS drops below a predetermined threshold. Thus, when the power is too low, the OMS may switch from the main path to one of the protection paths to divert traffic along fibers that are likely to experience less power loss. In the cases involving the monitoring of an OMS with many fiber spans, protection switching may be referred to as trunk protection.

It should be noted, however, that conventional systems capable of trunk protection switching are based on single-point power measurements and are configured to switch to protection paths when the power falls below an acceptable threshold at that point (e.g., at a switch input port). The actions of measuring power at a single point and comparing the measurements with thresholds may be repeated multiple times throughout the OMS. If the power is low but does not drop below the threshold at one point, conventional systems may simply compensate for the power loss by adjusting an amplifier to boost up the power. In this case, the power level can be maintained. However, this may also result in a degradation in a Signal-to-Noise Ratio (SNR). For example, a fiber pinch (i.e., when an optical fiber is sharply bent) may result in a small power loss. However, conventional systems usually do not detect power loss over the entire OMS and usually do not monitor SNR degradation.

In some cases, a photonic performance tool may be used to measure optical parameters, an example of which can include the Photonic Performance Gauge (PPG) available from the Applicant. Some conventional systems may use these measurements to restore power. However, to repeat, conventional systems do not evaluate paths (e.g., Layer 0 Control Plane (L0CP) paths) based on SNR measurements. Also, photonic performance tools are typically not linked with trunk protection solutions.

As suggested by the description above, it may be noted that there are problems with switching based on total power. Even though compensation may be used throughout an OMS to restore total power to an acceptable level, this does not mean the signals will have acceptable SNR values. Many faults (e.g., fiber pinch with EDFA compensation) can degrade SNR while maintaining total power. Since the conventional systems will typically not switch away from a faulty path, based on total power only, the conventional systems will tend to leave traffic on the degraded path, even when viable protection paths are available.

Also, another problem with conventional systems is that since switching is only based on single fault points, it may be customary to set thresholds at levels that will not be easily crossed, to therefore reduce the number of switching events over time. Thus, by setting the threshold high (or low) so that switching only happens if a fault causes a very large power loss, then cumulative minor faults over multiple fiber spans may not be detected and switching may very rare. Also, based on differences in fiber spans, the thresholds may be set at different levels, which may require comprehensive link engineering to set the thresholds properly.

Therefore, there is a need in the field of Optical Protection Switching (OPS) for performing protection switching in various situations in an OMS. As described herein and as is known in the art, there are various techniques for optical switching, including OPS, etc. An OPS includes a 1:2 splitter on the transmit side and a 2:1 switch on the receive side, such that a single transmitter and a single receiver can be optically protected. A Trunk Protection Switch (TPS) is an application of OPS where the OMS is optically protected on one or more optical link (trunk) lines (all of the signals on the fiber are switched together in this configuration).

A control system should be not only able to execute the switching to an alternative path when power loss is high, but also the control system should be able to switch to an alternative path when the SNR falls below a threshold, as described below with respect to the embodiments of the present disclosure.

BRIEF SUMMARY

The present disclosure is directed to systems and methods for determining when a switching action should be performed, in an optical protection switching system, based on a Signal-to-Noise Ratio (SNR) calculation degrading to a level below a predetermine threshold. A process, according to one implementation, includes obtaining parameters related to optical signals traversing an Optical Multiplex Section (OMS) of a communication network. The OMS may include multiple fiber spans defining a primary path and one or more protection paths. The process further includes using the obtained parameters to determine a SNR value associated with optical signals transmitted over the primary path. In response to determining that the SNR value falls below a predetermined threshold, the process further includes performing a switching action to enable transmission of optical signals over one of the one or more protection paths.

According to additional embodiments, the process may be further implemented whereby the SNR value is a cumulative value based on multiple signal degradations along the primary path. For example, the multiple signal degradations may include multiple minor deficiencies that add noise to the optical signals. Each minor deficiency may be configured such that it does not raise an alarm regarding total power loss. Also, each of the signal degradations may be related to one of a fiber pinch, an incorrect gain provisioning, noise added by a Raman amplifier, and spectrum shape distortion.

The OMS in these examples may include a plurality of switches each defined as one of a Trunk Protection Switch (TPS) and an Optical Protection Switch (OPS). Those skilled in the art will appreciate the techniques described herein can apply to any type of optical switching, with TPS and OPS as two examples. A system or controller configured to perform the process may include a photonic performance tool configured to calculate a decrease in incremental-SNR.

For example, the photonic performance tool may include inputs for receiving card circuit data, Optical Performance Monitoring (OPM) data, total power measurements, fiber type information, fiber length information, span losses, switch position information, and actuator settings related to amplifiers, Wavelength Selective Switching (WSS) devices, Variable Optical Attenuator (VOA) devices, and Raman amplifiers. Also, a system configured to perform the process may be incorporated in a) the OMS itself, b) a Software-Defined Networking (SDN) system, and/or c) a Network Monitoring System (NMS).

The process may further include a step of performing a preliminary test on the one or more protection paths to determine whether or not each protection path is acceptable as a backup path for the primary path. For example, the preliminary test may be based on a determined SNR level related to each protection path. Furthermore, the process may include sending an alert to a network operator regarding any issues with the one or more protection paths based on the respective SNR level.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
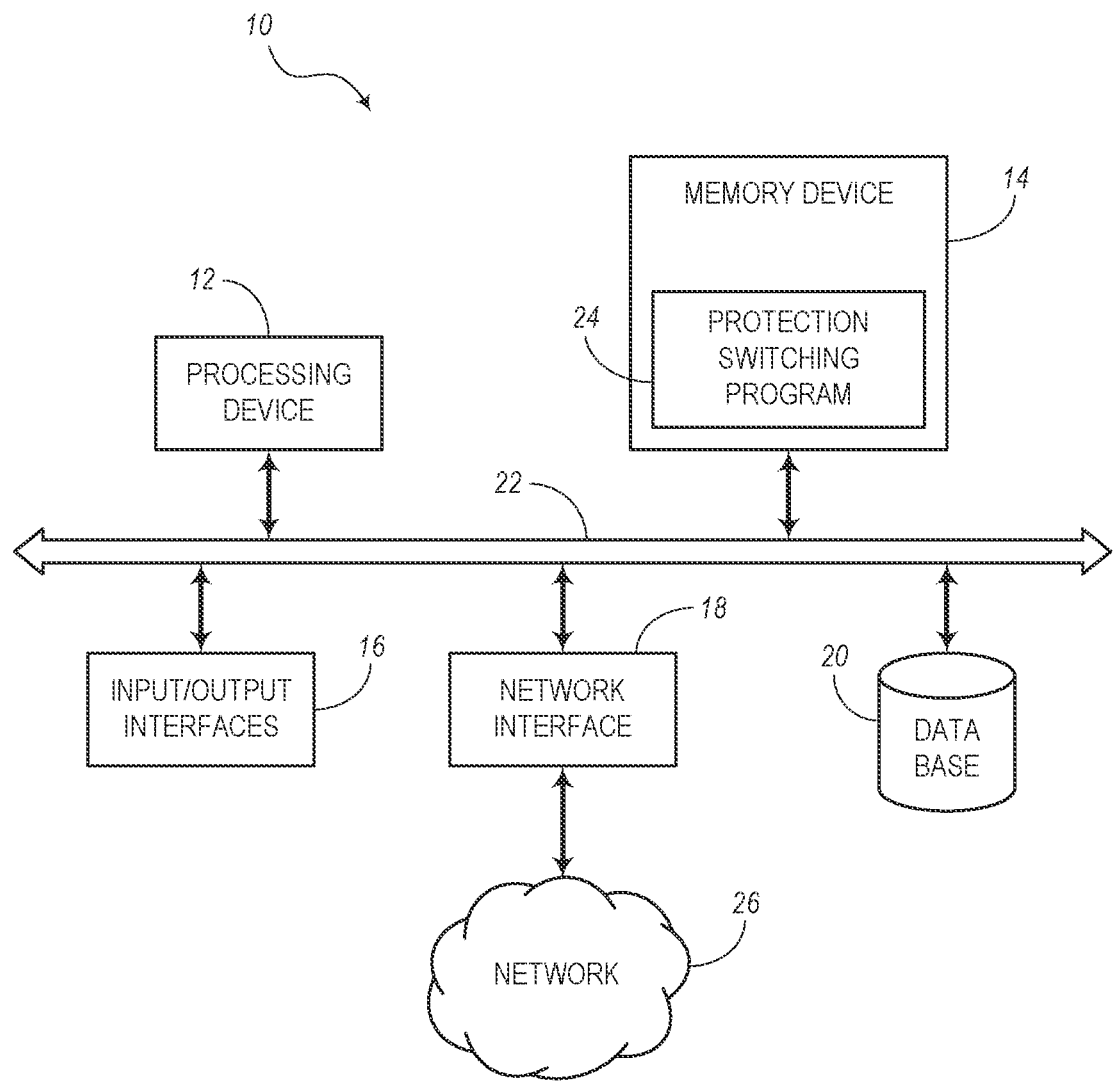
FIG. 1 is a block diagram illustrating a control system for detecting SNR degradation and automatically performing a switching action when the SNR value is too low, according to various embodiments.

The present disclosure relates to optically-protected systems and methods for estimating impairments in an Optical Multiplex Section (OMS) when there are multiple sources of linear and non-linear noise. Instead of following the conventional strategy of optically switching on power level change, the systems and methods of the present disclosure are configured to calculate the Signal-to-Noise Ratio, which is based on the cumulative noise resulting from multiple noise sources along the entire OMS. If the SNR value has degraded to such an extent that the SNR falls below a predetermined acceptable threshold, then the systems of the present disclosure are configured to switch to an alternative path to avoid a primary path that is experiencing excessive noise.

The embodiments of the present disclosure may be applicable to Optical Protection Switching (OPS) and Trunk Protection Switching (TPS) environments in a communication network, for example, as well as any other types of optical-based switching. In an OMS having multiple fiber spans, the present embodiments may designate any path as a primary path and any number of alternative paths as protection paths.

Instead of simply switching to a protection path in response to "power" thresholds, as is typically done in conventional systems, the embodiments of the present disclosure are configured to provide trunk protection solutions that not only rely comparisons with total power thresholds, but also rely on comparisons between estimated SNR and pre-defined SNR threshold. If single-point power measurements do not meet predetermined thresholds (switching based on total power only) and/or if a cumulative SNR calculation of the entire OMS does not meet predetermined thresholds, then the system can switch away from the "faulty" or "lossy" path to a protection path. A pro-active switch option exists for the SNR solution.

Although conventional systems are able to easily detect when there is a fiber cut (or other event in which there is no power) and can work well with an OMS that has a limited number of fiber spans, the present disclosure may be configured to operate on a scale with a larger number of fiber spans to detect the cumulative noise from multiple lossy points along the path. Also, the embodiments of the present disclosure are configured to overcome the limitations of conventional systems where compensation for multiple minor losses (e.g., multiple fiber pinches) result in degradation of the SNR. Other factors of the present disclosure that can overcome the issues with conventional systems are Stimulated Raman Scattering (SRS) effects increasing total power under fault conditions, incorrect provisioning causing more noise but still the correct total power, etc.

Thus, the present disclosure is able to recognize a heretofore unforeseen issue in the conventional systems where detection of total power does not always provide enough information with respect to determining when it is time to switch to protection paths. Also, the present disclosure can reduce the amount of time and effort that might normally be required to determine the best switch thresholds per section based on link design and other factors.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Control System

FIG. 1 is a block diagram illustrating an embodiment of a control system 10 for detecting SNR degradation and automatically performing a switching action when the SNR value is too low. The control system 10 may be configured to monitor an OMS (or multiple OMSs), any type of photonic line system, modem, routers, etc. in a communication network. Although reference is made to the monitoring and control of one or more OMSs, it should be noted the control system 10 may be applicable for controlling any line system, modem, etc. of a network. Generally, the control system 10 is configured to switch from a primary path to a protection path when an SNR calculation on the primary path drops below a predetermined threshold.

In the illustrated embodiment, the control system 10 may be a digital computing device that generally includes a processing device 12, a memory device 14, Input/Output (I/O) interfaces 16, a network interface 18, and a database 20. In some embodiments, the control system 10 may be a part of a Network Management System (NMS) or other similar system. It should be appreciated that FIG. 1 depicts the control system 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

For example, the control system 10 may be part of a control plane of a communication network in which one or more OMSs or line systems are incorporated. The control system 10 may communicate with a network 26 (or network section) via the network interface 18. The network 26 in these embodiments include at least the one or more OMSs being monitored or controlled. The control system 10 may receive telemetry data from the one or more OMSs. Each OMS may include multiple monitoring devices for detecting parameters of optical signals traversing the respective OMS. From the telemetry data, the control system 10 may be configured to calculate a cumulative SNR value, which may be indicative of multiple noise sources along the monitored path. The cumulative SNR value can be compared with a threshold to determine if the SNR value is acceptable. In the event that the SNR value has degraded to a point where the noise may deem the optical signals to be unreadable or unusable, or nearing such an unacceptable level, then the control system 10 can switch one or more switches in the OMS to cause the traffic to flow along an acceptable protection path, at least until the issues on the primary path can be resolved.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

In addition, the control system 10 also includes a protection switching program 24, which may be implemented in any suitable combination of software or firmware in the memory device 14 and/or hardware in the processing device 12. The protection switching program 24 may be stored in non-transitory computer-readable media (e.g., memory device 14) and may include computer logic or instructions that cause or enable the processing device 12 to perform various actions. In particular, the protection switching program 24 can enable the processing device 12 to receive telemetry data from an OMS or photonic line system (via the network interface 18), calculate SNR from the data, compare the SNR with a threshold, and perform a switching action to switch the monitored OMS from a primary path to a protection path if the SNR does not meet desired requirements (e.g., remaining above the threshold level).

Figure 2:
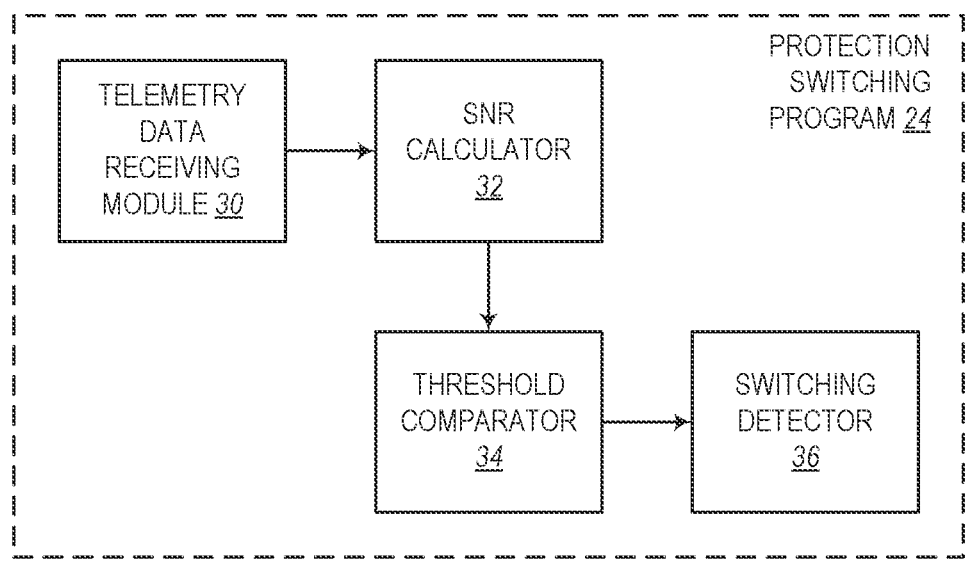
FIG. 2 is a block diagram illustrating the protection switching program shown in FIG. 1, according to various embodiments.

FIG. 2 is a block diagram illustrating an embodiment of the protection switching program 24 shown in FIG. 1. In the illustrated embodiment, the protection switching program 24 includes a telemetry data receiving module 30, an SNR calculator 32, a threshold comparator 34, and a switching detector 36. The telemetry data receiving module 30 may be configured to receive monitored parameters of an OMS, which may include power levels, noise levels, signal anomalies (e.g., tilting), etc. The data is analyzed by the SNR calculator 32 to determine the cumulative SNR value for the entire OMS. It may be determined that the SNR may degrade gradually along the OMS and may experience noise sources that add noise to the optical signals. Next, the threshold comparator 34 is configured to compare the measured SNR value with an acceptable minimum threshold, which may be predetermined and may be adjusted as needed based on automatic or manual input (e.g., adjustments by a network operator). The switching detector 36 is configured to determine, from the comparison with the threshold, whether the OMS should switch to a protection path. If multiple protection paths are available, the switching detector 36 may recommend one path over others, which may be based on information obtained before a switching event is needed (as described in more detail with respect to FIG. 5).

Monitoring Primary Path of an Optical Multiplex Section (OMS)

Figure 3:
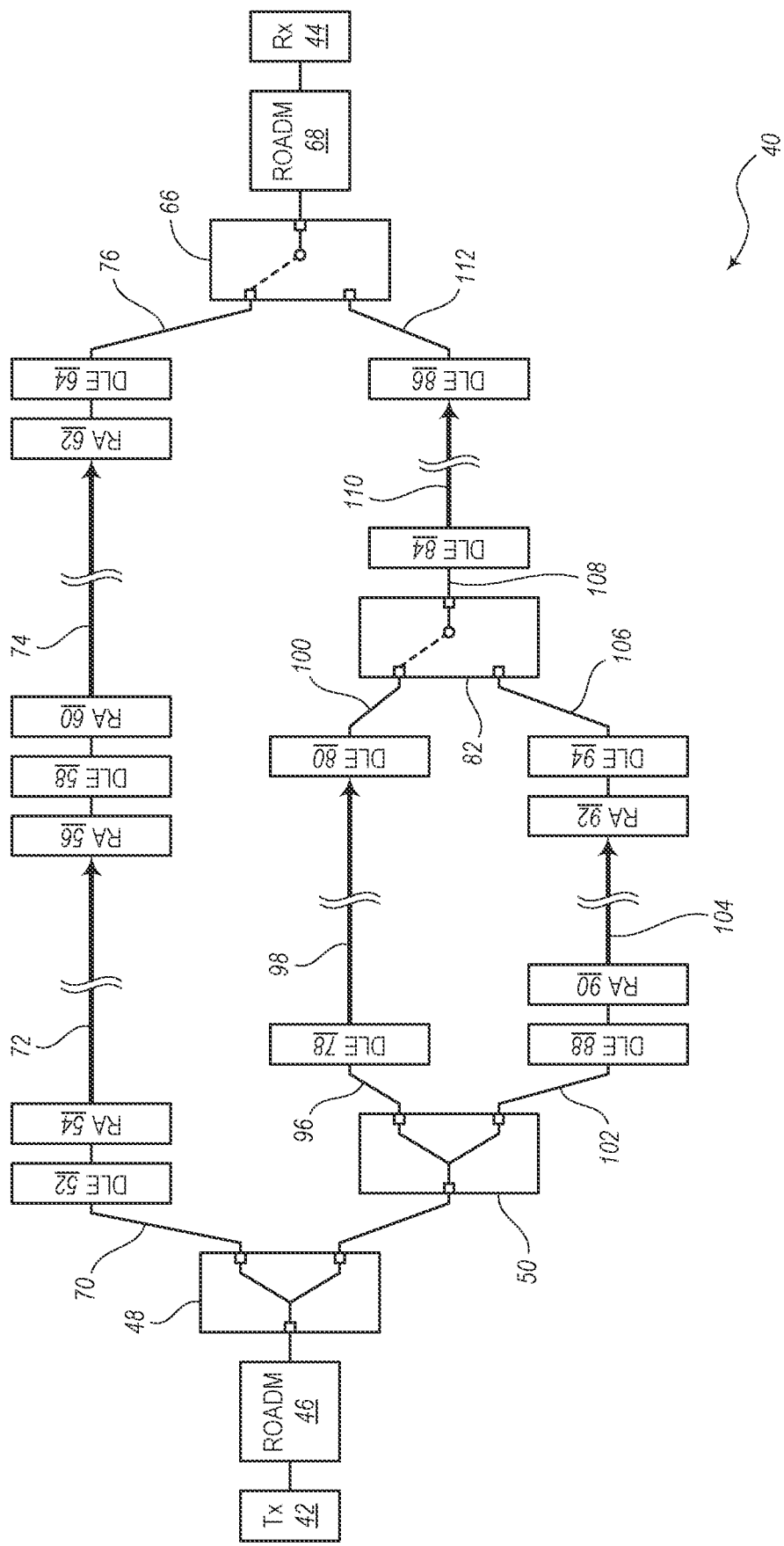
FIG. 3 is a diagram illustrating an example of an Optical Multiplex Section (OMS) being monitored and controlled by the control system of FIG. 1, according to various embodiments.

FIG. 3 is a diagram illustrating an example of an Optical Multiplex Section (OMS) 40 being monitored (and controlled) by the control system 10 of FIG. 1. It should be noted that any OMS can be monitored and controlled, particularly an OMS having multiple fiber spans. The OMS 40 may represent one example of a section of a photonic network that may be monitored by the control system 10. In other embodiments, sections may be related to any line system platform (e.g., reconfigurable system), such as those having Dual-Line Amplifiers (DLAs) or DLAs with Equalization (DLEs). Also, it should be noted that optical signals can be transmitted bi-directionally. However, to simplify the explanation of the embodiments of the present disclosure, the example of FIG. 3 is described with respect to transmission in one direction (i.e., left to right on the page) from a transmitter (Tx) 42 to a receiver (Rx) 44.

In the example shown in FIG. 3, the OMS 40 includes a first Reconfigurable Optical Add/Drop Multiplexer (ROADM) 46 connected to the Tx 42. The first ROADM 46 may include a 1×32 multiplexer (mux) and an amplifier. The OMS 40 further includes a first switch 48 and a second switch 50, each of which may be a trunk protection switch. The first and second switches 48, 50 may be TPS broadcast transmitting devices. According to one embodiment, the first switch 48 may be configured to direct traffic along a top path, which may be referred to a primary path. The OMS 40 may be configured to transmit signals along the primary path as a default, but then can switch to alternative paths in the event that the primary path is faulty or lossy.

The top path (or primary path) of the OMS in this example includes a first Dual-Line Amplifier (DLA) with Equalization (DLE) 52, a first Raman amplifier 54, a second Raman amplifier 56, a second DLE 58, a third Raman amplifier 60, a fourth Raman amplifier 62, and a third DLE 64. The third DLE 64 is connected to a third switch 66, which includes an output connected to a second ROADM 68, which in turn is connected to the Rx 44. The third switch 66 may be a TPS receiving device.

The fiber (or fibers) between the first switch 48 and the first DLE 52 may be referred to as a patch fiber 70. The fiber (or fibers) between the first and second Raman amplifiers 54, 56 may be referred to as a fiber span 72. Also, the fiber (or fibers) between the third and fourth Raman amplifiers 60, 62 may be referred to as a fiber span 74. The fiber (or fibers) between the third DLE 64 and the third switch 66 may be referred to as a patch fiber 76.

Again, the OMS 40 of FIG. 3 represents one example of an OMS and may include any suitable configuration. In the illustrated example, the OMS 40 further includes two additional paths, which may be referred to as protection paths, alternative paths, backup paths, etc. A second path (or first protection path) of the OMS 40 includes the top path of the second switch 50 and further includes a fourth DLE 78, a fifth DLE 80, a fourth switch 82, a sixth DLE 84, and a seventh DLE 86. This second path is connected to the third switch 66. A third path (or second protection path) of the OMS 40 includes the bottom path of the second switch 50 and further includes an eighth DLE 88, a fifth Raman amplifier 90, a sixth Raman amplifier 92, a ninth DLE 94, the fourth switch 82, and the sixth and seventh DLEs 84, 86. The fourth switch 82 may be a TPS receiving device. The second and fourth switches 50, 82 are configured to switch between the second and third paths (or first and second protection paths).

The fiber (or fibers) between the second switch 50 and the fourth DLE 78 may be a patch fiber 96. The fiber (or fibers) between the fourth and fifth DLEs 78, 80 may be a fiber span 98. The fiber (or fibers) between the fifth DLE 80 and the fourth switch 82 may be a path fiber. The fiber (or fibers) between the second switch 50 and the eighth DLE 88 may be a patch fiber. The fiber (or fibers) 104 between the fifth and sixth Raman amplifiers 90, 92 may be a fiber span. Also, the fiber (or fibers) 106 between the ninth DLE 94 and the fourth switch 82 may be a patch fiber. Regarding the parts of the second and third paths that coincide with each other, the fiber (or fibers) 108 between the fourth switch 82 and the sixth DLE 84 may be a patch fiber. The fiber (or fibers) between the sixth and seventh DLEs 84, 86 may be a fiber span 110. The fiber (or fibers) between the seventh DLE 86 and the third switch 66 may be a patch fiber 112.

The OMS 40 according to the example shown in FIG. 3 includes a configuration with a trunk or bundle of fiber spans with protection using Optical Protection Switches (OPSs). An OPS may usually be advantageous for switching when there is a total power drop (e.g., fiber cut). However, this type of switch may be blind to many other types of faults that incrementally degrade SNR over the length of the OMS 40 but are able to maintain the total power at an acceptable level.

The OMS 40 uses trunk protection to enable multiple diverse paths between the two ROADMs 46, 68 for protection switching. Again, it should be noted that the OMS 40 may represent a generalized system with an arbitrary number of spans, arbitrary types of spans, etc. In this example, the OMS 40 includes five different fiber spans 72, 74, 98, 104, 110. These spans 72, 74, 98, 104, 110 may include any combinations of Intermediate Line Amplifiers (ILAs), Non-Dispersion-Shifted Fibers (NDSFs), Non-Zero-Dispersion-Shifted Fibers (NZDSFs) or Dispersion-Shifted Fibers (DSFs), low dispersion fibers (e.g., TrueWave Reduced Slope (TWRS) fibers), and/or full spectrum fibers (e.g., 1260 nm to 1625 nm) NDSFs (e.g., Allwave).

Examples of SNR degradation events may include fiber pinches, an increase in gain of an Erbium-Doped Fiber Amplifier (EDFA) to compensate for a fiber pinch, switching based on a total power threshold, or any other type of small attenuation events. However, since total power does not always change, even in presence of multiple fiber pinches due to EDFA gain compensation, conventional systems may overlook the gradual degradation of SNR and will not switch away from a lossy path.

Therefore, the embodiments of the present disclosure are configured to perform a number of protection-type functions for efficiently transmitting signals along various paths, as follows:

First, a controller (e.g., control system 10) may detect multiple "minor" faults (e.g., small degradations in SNR) that are present on a path, where each minor fault contributes more noise. Examples may include fiber pinches, incorrect provisioning (e.g., EDFA gain mode), previous repairs (e.g., splices), etc. In one example, suppose minor faults (e.g., fiber pinches) are present on both spans 72, 74 of a primary path.

A controller (e.g., control system 10) may be running in the OMS 40 itself (e.g., on-box) and/or parallel to the OMS 40 in a control plane. The controller can compensate for individual losses. For example, span compensation may increase gain to counteract the minor fault. Again, this increase of power may be seen on an input port of a protection switch as effectively masking the degradation from the point of view of TPS or OPS since the total power is maintained.

Second, no single fault (e.g., each fiber pinch on spans 72, 74) on its own may be severe enough to cause TPS/OPS protection switching to occur. Thus, the control system 10 can detect a cumulative noise parameter. Fiber pinches or other minor faults can cause problems for conventional total-power-based protection switches. Again, even if there is a small power drop in a multi-span trunk, EDFAs may be used between pinches and points where total power is monitored. These EDFAs can raise the power back up at the low-power points (e.g., span compensation control), but may pass along signals having a lower SNR value that can go undetected in conventional systems.

Other minor faults may include incorrect provisioning. For example, an EDFA can be running in the wrong gain mode but still produce the expected total output power causing extra noise. Another minor fault may include a trunk with multiple fiber spans having amplification by Raman amplifiers. Given enough of these Raman amplifier spans, even a fiber cut (or a nearly complete power loss) may show up with enough total power downstream of the Raman amplifier where switching might be avoided. Yet another minor fault may be related to the shape of the spectrum of the optical signals. The total power may be a single measurement that does not take into account spectrum shape. For example, spectrum that is heavily tilted might impact the noise or signal performance, yet still may produce an expected total power level.

Third, the cumulative effect of minor faults may be such that SNR through path degrades to point where data traffic is negatively impacted in the OMS 40.

Fourth, the OMS 40 performance can deteriorate to the point of not being able to carry traffic, yet protection switching (without the help of the embodiments described in the present disclosure) will never occur.

Fifth, there is a path forward for single faults (e.g., single fiber pinch) to pass a predefined threshold specific to that fault and trigger a protection switch. However, there is no available mechanism in the conventional systems to evaluate the cumulative effect of multiple faults on performance. Nevertheless, the embodiments of the present disclosure are configured to gather the telemetric data obtained throughout the OMS 40 to detect small degradations and then use that knowledge to initiate protection switching as needed.

Any fault in a section (e.g., OMS 40) that induces noise and at the same time does not cause the total power to drop below a predetermined level might leave the system vulnerable to keeping traffic on a severely degraded path when viable alternatives available via protection switch. Thus, the embodiments of the present disclosure overcome this deficiency in prior systems.

For a trunk protection solution, such as the OMS 40 of FIG. 3, any suitable monitoring devices (e.g., photonic performance tool, etc.) can be used to calculate SNR, cumulative SNR, incremental-SNR, etc. for the OMS 40. Measurements may be communicated to the control system 10 via telemetry via the network interface 18.

The monitoring devices (e.g., photonic performance tool, modems, etc.) may have many different types of inputs for measuring different parameters along the OMS 40. For example, monitoring inputs may include card circuit data, OPM data, total-power measurements, etc. Additional inputs may include detection of fiber types, fiber lengths, span losses, etc. Also, the monitoring devices may include inputs to obtain actuator settings (e.g., amplification information, Wavelength Selective Switching (WSS) information, Variable Optical Attenuation (VOA) information, Raman amplifier setting information, etc.), switch positions, etc.

In some embodiments, the control system 10 may be configured to include predictive analysis to determine a plan for operating the switches in the OMS 40 (or other section of a network). For example, planning tool outputs may include strategies for setting switch positions for switches 48, 50, 66, 82, amplification and attenuation levels for various amplifiers throughout the OMS 40, expected incremental-SNR values, etc. Alternatively, baseline SNR can be recorded after system commissioning/calibration.

Based on designed channel margins, an SNR degrade threshold can be set for the section (e.g., OMS 40). If the calculated incremental-SNR degrades from the baseline below the threshold, a system (e.g., control system 10) may be configured to perform protection switching away from degraded paths. For example, a forced switch may be enacted to keep traffic away from known degraded paths. Also, in some embodiments, the control system 10 may be configured to provide an alarm or warning to a network operator associated with the section (e.g., OMS 40) to let him or her know that a switching action has occurred and reasons (e.g., low cumulative SNR along a path) why the switching action was performed.

In one scenario, monitoring devices may be utilized along the primary path (e.g., path through fibers 72, 74). The monitoring devices may measure various parameters and pass this data to the control system 10. The control system 10 can then calculate SNR (e.g., using a photonic performance tool, SNR calculator 32, etc.). The control system 10 can then compare the calculated SNR with expected acceptable levels (e.g., using threshold comparator 34, etc.). Then, the switching detector 36 may be used to determine if the SNR level is acceptable. If so, no switching action is needed and the data traffic is allowed to stay on the primary path.

According to one implementation, the control system 10 is configured to evaluate the active path (e.g., primary path through fibers 72, 74) and switch to another path when the SNR has degraded. Multiple minor faults might occur on the section over time, where, individually, each minor fault might be small enough where it does not trigger a switching action according to typical total-power-loss solutions. In the present disclosure, the cumulative effect of minor faults may add noise and reduce SNR over the length of the section. The photonic performance tool (or other monitoring devices) may obtain measurements and other data from the section and calculate an SNR decrease in real-time. When degradation is larger than a threshold (e.g., SNR drops below a minimum acceptable level), a protection switching action is triggered away from the known degraded path (e.g., primary path) to keep traffic alive. This switching action can be performed automatically without operator input.

In some embodiments, the SNR detection and automatic switching may be performed in a Software-Defined Network (SDN) layer or on the devices or components of the OMS 40 itself (e.g., "on-box"). For example, an SDN implementation of the present disclosure may leverage real-time analytics and advanced automation across a programmable photonic layer to help maximize network assets and to optimize optical performance. Some processing, calculating, detection, etc. may be performed on-box, such as with photonic performance tool devices (or other similar devices), which can potentially enable faster system response than functionality in the SDN layer.

Pre-Testing Protection Paths of an OMS

Furthermore, other embodiments of the present disclosure may include the steps of testing the alternative or protective paths when the primary path is active. In this way, if or when the primary path experiences a low SNR level, the control system 10 can switch to a protective path that has been checked and is found to be acceptable for handling the data traffic. In some embodiments, if multiple protection paths are available, such as in the example of the OMS 40 of FIG. 3, the control system 10 can determine, in advance, which path is best suited for handling the data traffic when a switching action away from the primary path is needed. This pre-testing of protection paths may be performed periodically to ensure that a proper protection path is available if or when it is needed.

Thus, according to another implementation, the control system 10 may be configured to evaluate the viability of the protection paths and switch to only the paths are determined to be viable. According to an example of a pre-test technique, suppose a fault (e.g., minor fault, fiber pinch, etc.) exists on the span 104 associated with the third path (or second protection path including spans 104 and 110), the control system 10 may determine that the second path (or first protection path including spans 98 and 110) is a better backup path to be used if the primary path (or first path including spans 72, 74) is unavailable (e.g., if the SNR level on this path is too low).

Depending on the equipment, components, platform of the deployed section (e.g., OMS 40), the control system 10 may predict with decent accuracy the viability of the protection paths in nested-TPS applications. This will allow the control system 10 to automatically switch to a viable path directly when needed. Also, the control system 10 can proactively display information to a network operator as to which protection paths are acceptable for backup purposes and/or those that are in jeopardy of not be able to carry traffic. In this way, a network operator can schedule repair or replacement actions for those paths that might be unable to carry traffic.

According to various embodiments, the photonic performance tool described in the present disclosure may be an application in an SDN or running in the section itself. This network application in some cases can be modem agnostic (e.g., is not dependent on the type of modem being used in the section).

Protection Switching Process

Figure 4:
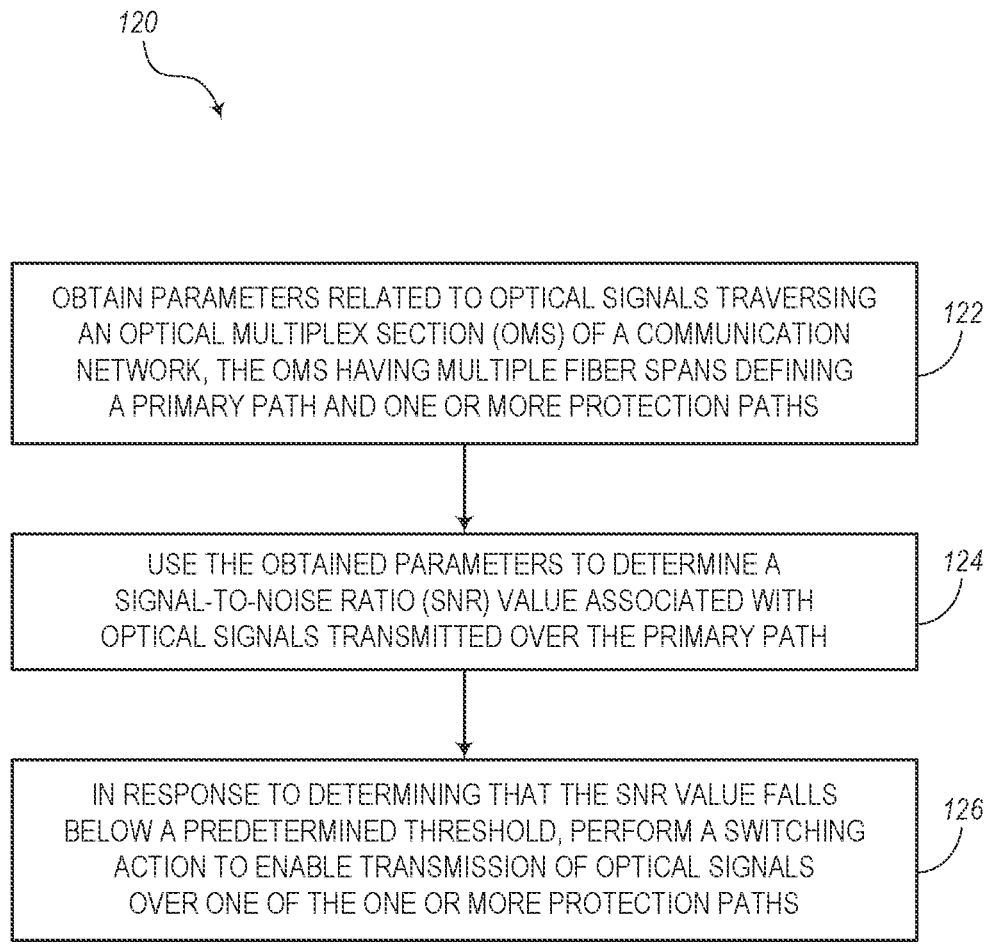
FIG. 4 is a flow diagram illustrating a process for switching from a primary path to a secondary (protection) path based on SNR degradation, according to various embodiments.

FIG. 4 is a flow diagram illustrating an embodiment of a process 120 for switching from a primary path to a secondary (protection) path based on SNR degradation. As illustrated, the process 120 includes obtaining parameters related to optical signals traversing an Optical Multiplex Section (OMS) of a communication network, as indicated in block 122. The OMS in this embodiment has multiple fiber spans defining a primary path and one or more protection paths. The process 120 further includes using the obtained parameters to determine a Signal-to-Noise Ratio (SNR) value associated with optical signals transmitted over the primary path, as indicated in block 124. In response to determining that the SNR value falls below a predetermined threshold, the process 120 further includes performing a switching action to enable transmission of optical signals over one of the one or more protection paths, as indicated in block 126.

According to some embodiments, the process 120 may be further implemented whereby the SNR value is a cumulative value based on multiple signal degradations along the primary path. For example, the multiple signal degradations may include multiple minor deficiencies that add noise to the optical signals. Each minor deficiency may be configured such that it does not raise an alarm regarding total power loss. Also, each of the signal degradations may be related to one of a fiber pinch, an incorrect gain provisioning, noise added by a Raman amplifier, and spectrum shape distortion.

The OMS in these examples may include a plurality of switches each defined as one of a Trunk Protection Switch (TPS) and an Optical Protection Switch (OPS). A system or controller configured to perform the process 120 may include a photonic performance tool configured to calculate a decrease in incremental-SNR. For example, the photonic performance tool may include inputs for receiving card circuit data, Optical Performance Monitoring (OPM) data, total power measurements, fiber type information, fiber length information, span losses, switch position information, and actuator settings related to amplifiers, Wavelength Selective Switching (WSS) devices, Variable Optical Attenuator (VOA) devices, and Raman amplifiers. Also, a system configured to perform the process 120 may be incorporated in a) the OMS itself, b) a Software-Defined Networking (SDN) system, and/or c) a Network Monitoring System (NMS).

The process 120 may further include a step of performing an ongoing evaluation on the one or more protection paths to determine whether or not each protection path is acceptable as a backup path for the primary path. For example, the evaluation may be based on a determined SNR level related to each protection path. Furthermore, the process 120 may include sending an alert to a network operator regarding any issues with the one or more protection paths based on the respective SNR level. In some embodiments, the process 120 may be associated with a controller that can run in the OMS to compensate for losses at certain points or fiber spans in the OMS. Again, a power measurement might mask the SNR degradation and may not necessarily reliable for determining situation where multiple minor issues exist on a transmission path. Also, in some embodiments, the process 120 may send an alarm or warning to explain to the network operator any switching action that are being or have been performed as well as information regarding why the switching action was made.

Of note, the foregoing description included a process for detecting SNR degradation and automatically performing a switching action when the SNR value is too low. Those skilled in the art will recognize the switching action may also be performed manually, such as where the detected degraded SNR is used to cause an alarm, warning, notification, etc. to a user, Network Operations Center (NOC), Network Management System (NMS), etc., where this alarm, warning, notification, etc. can be used by the user to manually cause the switching action. In an embodiment, the notification of the degraded SNR can be provided to the user and the switching action can be based on a confirmation from the user. In another embodiment, the switching action can be automatic with the degraded SNR provided as a notification. Those skilled in the art will recognize any implementation is contemplated, whether manual or automatic switching.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
a processing device, and
a memory device configured to store a computer program having instructions that, when executed, enable the processing device to
obtain parameters related to optical signals traversing an Optical Multiplex Section (OMS) of a communication network, the OMS having multiple fiber spans defining a primary path and one or more protection paths, and the OMS including a plurality of switches configured to optical switch between the primary path and the one or more protection paths based on optical power level,
during operation of the OMS where one or more signal degradations along the primary path occur, wherein the one or more signal degradations add noise to the optical signals but do not affect the optical power level enough to cause a switching action, use the obtained parameters to determine a cumulative Signal-to-Noise Ratio (SNR) value associated with optical signals transmitted over the primary path, and
in response to determining that the cumulative SNR value falls below a predetermined threshold, perform the switching action with the plurality of switches to enable transmission of optical signals over one of the one or more protection paths such that the plurality of switches do not rely on total power only.

2. The system of claim 1, wherein the multiple signal degradations include multiple minor deficiencies that add noise to the optical signals, and wherein each minor deficiency does not raise an alarm regarding total power loss.

3. The system of claim 1, wherein each of the signal degradations is related to one of a fiber pinch, an incorrect gain provisioning, and spectrum shape distortion.

4. The system of claim 1, wherein the plurality of switches each include one of a Trunk Protection Switch (TPS) and an Optical Protection Switch (OPS).

5. The system of claim 1, further comprising a photonic performance tool configured to calculate the cumulative SNR.

6. The system of claim 5, wherein the photonic performance tool includes inputs for receiving card circuit data, Optical Performance Monitoring (OPM) data, total power measurements, fiber type information, fiber length information, span losses, switch position information, and actuator settings related to amplifiers, Wavelength Selective Switching (WSS) devices, Variable Optical Attenuator (VOA) devices, and Raman amplifiers.

7. The system of claim 1, wherein the system is incorporated in one or more of the OMS itself, a Software-Defined Networking (SDN) system, and a Network Monitoring System (NMS).

8. The system of claim 1, wherein the instructions further enable the processing device to perform an ongoing evaluation on the one or more protection paths to determine whether or not each protection path is acceptable as a backup path for the primary path based on a determined cumulative SNR level related to each protection path.

9. The system of claim 8, wherein the instructions further enable the processing device to send an alert to a network operator regarding any issues with the one or more protection paths based on the respective cumulative SNR level.

10. The system of claim 1, wherein the switching action is performed one of automatically and manual.

11. The system of claim 1, wherein the plurality of switches are in a nested configuration on the OMS where one set of switches is located between a second set of switches.

12. A non-transitory computer-readable medium configured to store computer logic having instructions that, when executed, cause one or more processing devices to:
obtain parameters related to optical signals traversing an Optical Multiplex Section (OMS) of a communication network, the OMS having multiple fiber spans defining a primary path and one or more protection paths, and the OMS including a plurality of switches configured to optically switch between the primary path and the one or more protection paths based on optical power level,
during operations of the OMS where one or more signal degradations along the primary path occur, wherein the one or more signal degradations add noise to the optical signals but do not affect the optical power level enough to cause a switching action, use the obtained parameters to determine a cumulative Signal-to-Noise Ratio (SNR) value associated with optical signals transmitted over the primary path, and
in response to determining that the cumulative SNR value falls below a predetermined threshold, perform the switching action with the plurality of switches to enable transmission of optical signals over one of the one or more protection paths such that the plurality of switches do not rely on total power only for the switching action.

13. The non-transitory computer-readable medium of claim 12, wherein the multiple signal degradations include multiple minor deficiencies that add noise to the optical signals, and wherein each minor deficiency does not raise an alarm regarding total power loss.

14. The non-transitory computer-readable medium of claim 12, wherein each of the signal degradations is related to one of a fiber pinch, an incorrect gain provisioning, and spectrum shape distortion.

15. The non-transitory computer-readable medium of claim 12, wherein the plurality of switches each include one of a Trunk Protection Switch (TPS) and an Optical Protection Switch (OPS).

16. A method comprising the steps of:
obtaining parameters related to optical signals traversing an Optical Multiplex Section (OMS) of a communication network, the OMS having multiple fiber spans defining a primary path and one or more protection paths, and the OMS including a plurality of switches configured to optical switch between the primary path and the one or more protection paths based on optical power level,
during operation of the OMS where one or more signal degradations along the primary path occur, wherein the one or more signal degradations add noise to the optical signals but do not affect the optical power level enough to cause a switching ation, using the obtained parameters to determine a cumulative Signal-to-Noise Ratio (SNR) value associated with optical signals transmitted over the primary path, and
in response to determining that the cumulative SNR value falls below a predetermined threshold, performing the switching action with the plurality of switches to enable transmission of optical signals over one of the one or more protection paths such that the plurality of switches do not rely on total power only.

17. The method of claim 16, further comprising the step of calculating current cumulative SNR based on receiving card circuit data, Optical Performance Monitoring (OPM) data, total power measurements, fiber type information, fiber length information, span losses, switch position information, and actuator settings related to amplifiers, Wavelength Selective Switching (WSS) devices, Variable Optical Attenuator (VOA) devices, and Raman amplifiers.

18. The method of claim 16, wherein the method is executed by one or more of the OMS itself, a Software-Defined Networking (SDN) system, and a Network Monitoring System (NMS).

19. The method of claim 16, further comprising the step of performing a preliminary test on the one or more protection paths to determine whether or not each protection path is acceptable as a backup path for the primary path based on a determined SNR level related to each protection path.

20. The method of claim 16, further comprising the steps of
 using the obtained parameters to determine a second cumulative Signal-to-Noise Ratio (SNR) value associated with optical signals transmitted over the one or more protection paths, and
 in response to determining that the second cumulative SNR value falls below a predetermined threshold, proactively displaying information to a network operator as to which of the one or more protection path are acceptable for backup purposes and those that are in jeopardy of not be able to carry traffic.

\* \* \* \* \*